(12) United States Patent
Manivannan et al.

(10) Patent No.: US 11,348,129 B2
(45) Date of Patent: May 31, 2022

(54) SYSTEM AND METHOD FOR DETERMINING OPTIMUM PRICE CURVE AND DYNAMICALLY UPDATING PRODUCT PRICE

(71) Applicant: Mastercard International Incorporated, Purchase, NY (US)

(72) Inventors: Hari Manivannan, San Francisco, CA (US); Sunny Fung, San Francisco, CA (US); Douglas Roche, Los Altos, CA (US); Jose Qiu Chou, San Leandro, CA (US); Kevin Soncuya, San Francisco, CA (US); Shilpa Herenjal, Clayton, CA (US)

(73) Assignee: Mastercard International Incorporated, Purchase, NY (US)

( * ) Notice: Subject to any disclaimer, the term of this patent is extended or adjusted under 35 U.S.C. 154(b) by 80 days.

(21) Appl. No.: 16/783,645

(22) Filed: Feb. 6, 2020

(65) Prior Publication Data
US 2021/0248634 A1 Aug. 12, 2021

(51) Int. Cl.
| | | |
|---|---|---|
| *G06Q 30/02* | (2012.01) | |
| *G06Q 10/08* | (2012.01) | |
| *G06Q 40/02* | (2012.01) | |
| *G06F 16/23* | (2019.01) | |
| *G06F 16/248* | (2019.01) | |
| *G06N 20/00* | (2019.01) | |
| *G06N 5/04* | (2006.01) | |
| *G06Q 40/00* | (2012.01) | |

(52) U.S. Cl.
CPC ..... *G06Q 30/0206* (2013.01); *G06F 16/2379* (2019.01); *G06F 16/248* (2019.01); *G06N 5/04* (2013.01); *G06N 20/00* (2019.01); *G06Q 10/087* (2013.01); *G06Q 30/0205* (2013.01); *G06Q 30/0281* (2013.01); *G06Q 40/12* (2013.12)

(58) Field of Classification Search
None
See application file for complete search history.

(56) References Cited

U.S. PATENT DOCUMENTS 7,461,023 B1 * 12/2008 Helweg ................. G06Q 40/00
705/35
8,140,381 B1 * 3/2012 Wu .................... G06Q 30/0206
705/7.35

(Continued)

*Primary Examiner* — Sujay Koneru
(74) *Attorney, Agent, or Firm* — Hovey Williams LLP

(57) ABSTRACT

A system and method are provided for determining an optimum price curve to a target date and dynamically updating a price of a product in real-time in a store of a merchant. A merchant database contains and a third-party source provides information which is relevant to determining the price. An enhanced data engine and database generates and stores enhanced information which is derived from the merchant and third-party information and which is relevant to determining the price of the product. A dynamic pricing mechanism includes an artificial intelligence trained on the enhanced information and is configured to determine the optimum price curve for the product, and to transmit a current price from the optimum price curve via a communications network. An electronic price display is located in the store and receives from the dynamic pricing mechanism and visually displays in real-time the current price of the product.

9 Claims, 4 Drawing Sheets

(56) References Cited

U.S. PATENT DOCUMENTS

Figure 1:
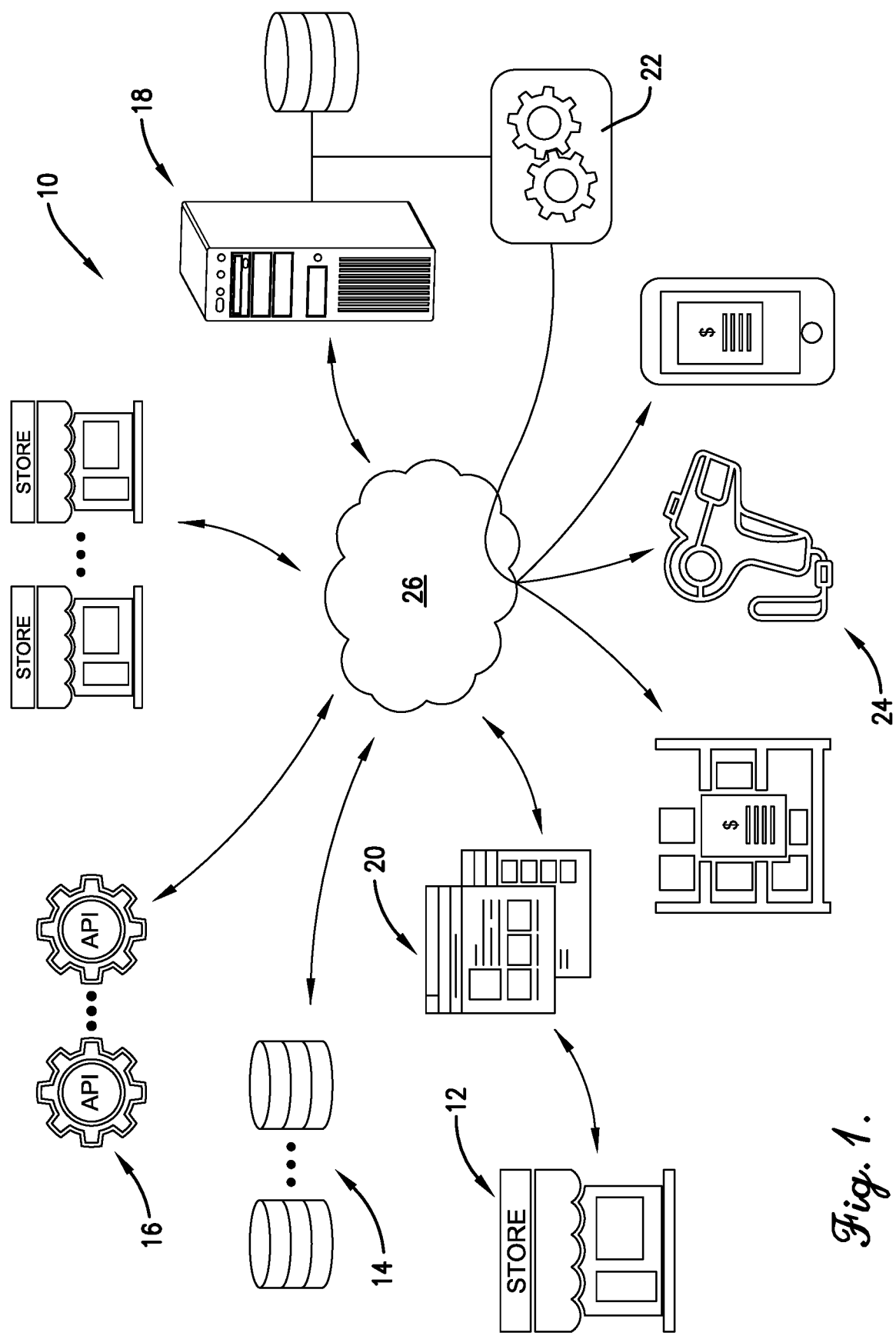

| | | | | |
|---|---|---|---|---|
| 8,332,260 | B1* | 12/2012 | Mysen | G06Q 10/00 |
| | | | | 705/7.35 |
| 10,467,327 | B1* | 11/2019 | Arazi | G06F 17/18 |
| 2003/0050879 | A1* | 3/2003 | Rosen | G06Q 40/04 |
| | | | | 705/35 |
| 2007/0112635 | A1* | 5/2007 | Loncaric | G06Q 30/0625 |
| | | | | 705/7.35 |
| 2007/0143171 | A1* | 6/2007 | Boyd | G06Q 30/0278 |
| | | | | 705/306 |
| 2008/0065566 | A1* | 3/2008 | Eglen | G06Q 30/0206 |
| | | | | 705/400 |
| 2008/0235076 | A1* | 9/2008 | Cereghini | G06Q 30/0202 |
| | | | | 705/7.35 |
| 2012/0259794 | A1* | 10/2012 | Shanahan | G06Q 30/00 |
| | | | | 705/348 |
| 2013/0325554 | A1* | 12/2013 | Ouimet | G06Q 30/02 |
| | | | | 705/7.35 |
| 2015/0278934 | A1* | 10/2015 | Endras | G06Q 30/08 |
| | | | | 705/80 |
| 2016/0253690 | A1* | 9/2016 | Richardson | G06Q 40/12 |
| | | | | 705/7.35 |
| 2017/0032456 | A1* | 2/2017 | Strauss | G06Q 30/0283 |
| 2017/0116631 | A1* | 4/2017 | Sarin | G06Q 30/0206 |
| 2018/0089707 | A1* | 3/2018 | Sills | G06Q 10/067 |
| 2018/0181974 | A1* | 6/2018 | Lynch | G06F 17/18 |
| 2019/0108538 | A1* | 4/2019 | Montero | G06Q 30/0211 |
| 2019/0122176 | A1* | 4/2019 | Wu | G06Q 10/087 |
| 2019/0244230 | A1* | 8/2019 | Subramanian | G06Q 10/02 |

* cited by examiner

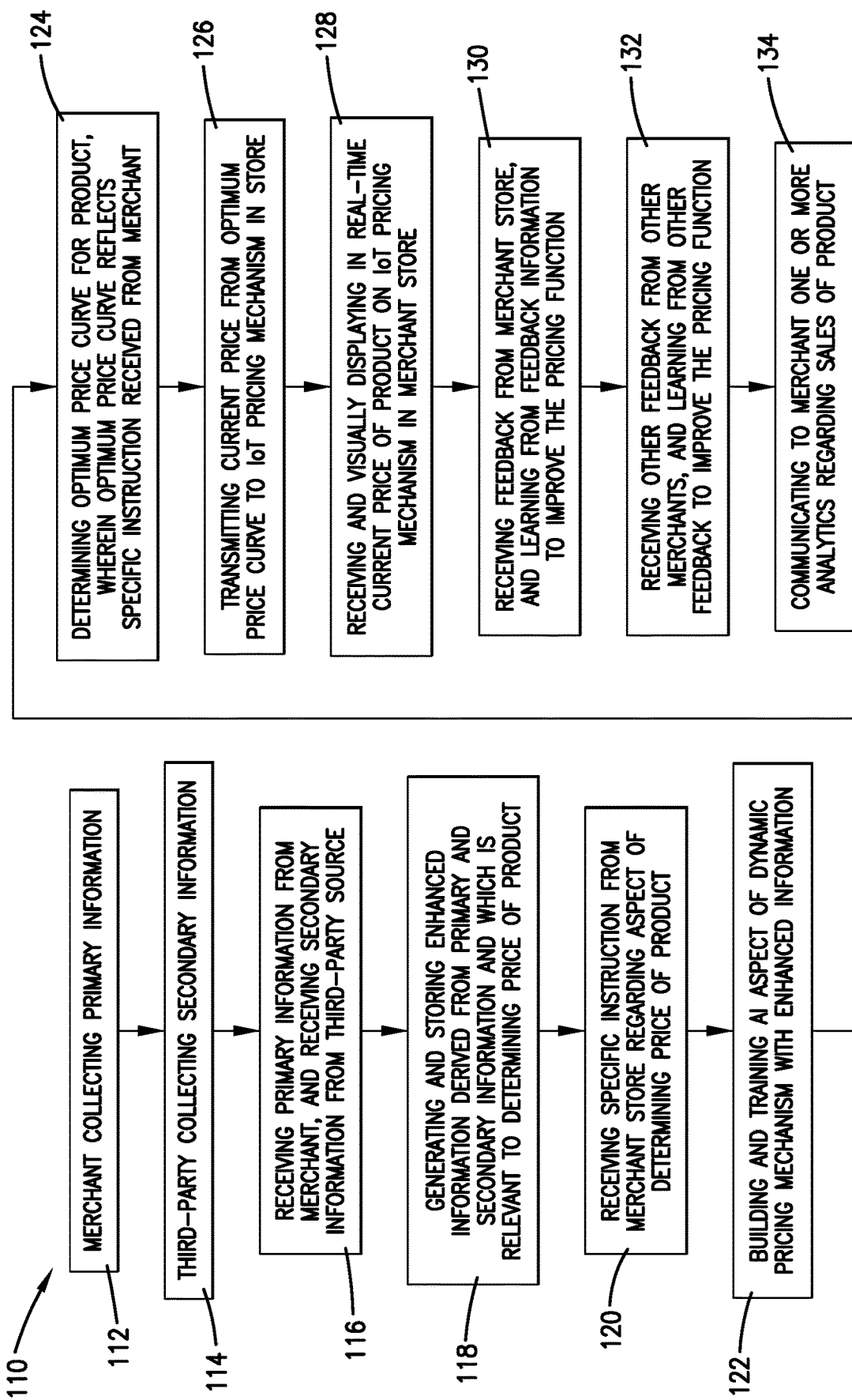

SYSTEM AND METHOD FOR DETERMINING OPTIMUM PRICE CURVE AND DYNAMICALLY UPDATING PRODUCT PRICE

FIELD

The present invention relates to systems and methods for setting and adjusting product prices, and more particularly, embodiments concern a system and method using artificial intelligence to determine an optimum price curve and dynamically update a product price in a store in real-time in order to maximize sales of and/or revenues from the product prior to a target date.

BACKGROUND

Many types of products (e.g., foods) have expiration or best-use dates after which merchants cannot or, at least, likely will not sell them. Other types of products (e.g., electronics) have shelf-life dates by which merchants desire that they be sold to make room for new stock. Still other types of products (e.g. holiday-specific decorations) have use-specific dates after which they are unlikely to sell. Thus, it is often desirable among merchants to maximize the sales of such products by their associated expiration, best-use, shelf-life, use-specific, or other target dates.

For example, approximately forty-three billion pounds of produce is disposed of annually for being past their best-use dates. One cause of this is that prior art static pricing mechanisms do not efficiently adapt to changing supply and demand. Legacy pricing approaches such as coupons and discounts are effective to drive sales but are slow to deploy and therefore do not solve the problem of adapting to changing supply and demand within relatively short time periods. It requires far too much time for merchants to communicate to customers that an item is on sale (e.g., coupons must reach consumers, or employees must decide-upon and physically change prices), and as a result sales and/or revenues are not maximized prior to target dates, which results in waste and lost revenues.

This background discussion is intended to provide information related to the present invention which is not necessarily prior art.

SUMMARY

Embodiments address the above-described and other problems and limitations in the prior art by providing a system and method using artificial intelligence to determine an optimum price curve and dynamically update a product price in a store in real-time in order to drive sales by incentivizing customers to purchase and thereby maximize sales of and/or revenues from the product prior to a target date.

In a first embodiment of the present invention, a system is provided for determining an optimum price curve and dynamically updating a price of a product in real-time in a store of a merchant. The system may include a merchant database, an enhanced data engine and database, a dynamic pricing mechanism, and an electronic price display. The merchant database may contain primary information which is relevant to determining the price of the product. The enhanced data engine and database may be configured to generate and store enhanced information which is derived from at least the primary information and which is relevant to determining the price of the product. The dynamic pricing mechanism may include an artificial intelligence trained on the enhanced information, and may be configured to determine the optimum price curve for the product and to transmit a current price from the optimum price curve via a communications network. The electronic price display may be located in the merchant store and may be configured to receive from the dynamic pricing mechanism and visually display in real-time the current price of the product.

In a second embodiment, a system is provided for determining an optimum price curve to a target date and dynamically updating a price of a product in real-time in a store of a merchant. The system may include a merchant database, a third-party data source, an enhanced data engine and database, a dashboard and rules interface, a dynamic pricing mechanism, and an electronic price display. The merchant database may contain primary information which is relevant to determining the price of the product. The third-party data source may provide secondary information which is also relevant to determining the price of the product. The enhanced data engine and database may be configured to generate and store enhanced information which is derived from the primary information and the secondary information and which is relevant to determining the price of the product. The dashboard and rules interface may be configured to provide an electronic interface by which the merchant may provide a specific instruction regarding an aspect of determining the price of the product. The dynamic pricing mechanism may include an artificial intelligence trained on the enhanced information, and may be configured to determine the optimum price curve for the product, wherein the optimum price curve reflects the specific instruction provided by the merchant via the dashboard and rules interface, and may be further configured to transmit a current price from the optimum price curve via a communications network. The electronic price display may be located in the merchant store and may be configured to receive from the dynamic pricing mechanism and visually display in real-time the current price of the product.

In a third embodiment, a method is provided for determining an optimum price curve to a target date and dynamically updating a price of a product in real-time in a store of a merchant. The method may include the following steps. Primary information which is relevant to determining the price of the product may be received from a merchant database. Secondary information which is also relevant to determining the price of the product may be received from a third-party data source. Enhanced data which is derived from the primary information and the secondary information and which is relevant to determining the price of the product may be generated and stored with an enhanced data engine and database. A specific instruction regarding an aspect of determining the price of the product may be received from a merchant store via a dashboard and rules interface. An artificial intelligence aspect of a dynamic pricing mechanism may be trained with the enhanced information from the enhanced data engine, and an optimum price curve for the product may be determined by the dynamic pricing mechanism, wherein the optimum price curve may reflect the specific instruction provided by the merchant store via the dashboard and rules interface. A current price from the optimum price curve from the dynamic pricing mechanism may be transmitted via a communications network to an electronic price display in the merchant store. The current price of the product may be received from the dynamic pricing mechanism and visually displayed in real-time on the electronic price display in the merchant store.

Various implementations of the above-described embodiments may include any one or more of the following features. The primary information may include timestamp information including a stock date, the target date, and a sale date; pricing information including a stocked inventory price and a purchased inventory price; merchant information including a price point, a location, a type of inventory, and one or more competitors; and geolocation information including supply and demand information, an inflation level, a depression level, one or more consumer habits, and a competitor price. The primary information may include one or more years of historical information, and the secondary information may include one or more years of historical third-party primary information for one or more other merchants. The enhanced information may include a time period within which to dynamically update the price of the product in order to maximize sales of or revenue from the product, wherein the time period is derived from a current date and the target date. The enhanced information may include a change in the price of the product over time, a first optimal price for maximizing sales, and a second optimal price for maximizing revenue. The enhanced information may include one or more of the following: an average number of customers per time period, a total number of customers per time period, a number of competitors within a particular distance from the store, an average amount of revenue per time period, an average loss per time period, a total amount of revenue per time period, and a total loss per time period, an average amount of inventory sold per time period, and a total amount of inventory sold per time period.

The specific instruction provided by the merchant using the dashboard and rules interface may be a minimum price for the product below which the dynamic pricing mechanism cannot set the price for the product. The electronic price display may be mounted on a physical structure which physically supports the product. The electronic price display may be on a smartphone executing a software application which visually displays the price of the product. The dynamic pricing mechanism may be further configured to receive feedback information provided by the merchant and to learn from the feedback information to improve determining the optimum price curve for the product. The dynamic pricing mechanism may be further configured to communicate to the merchant via the dashboard and rules interface one or more analytics regarding the sales of the product.

This summary is not intended to identify essential features of the present invention, and is not intended to be used to limit the scope of the claims. These and other aspects of the present invention are described below in greater detail.

DRAWINGS

Figure 2:
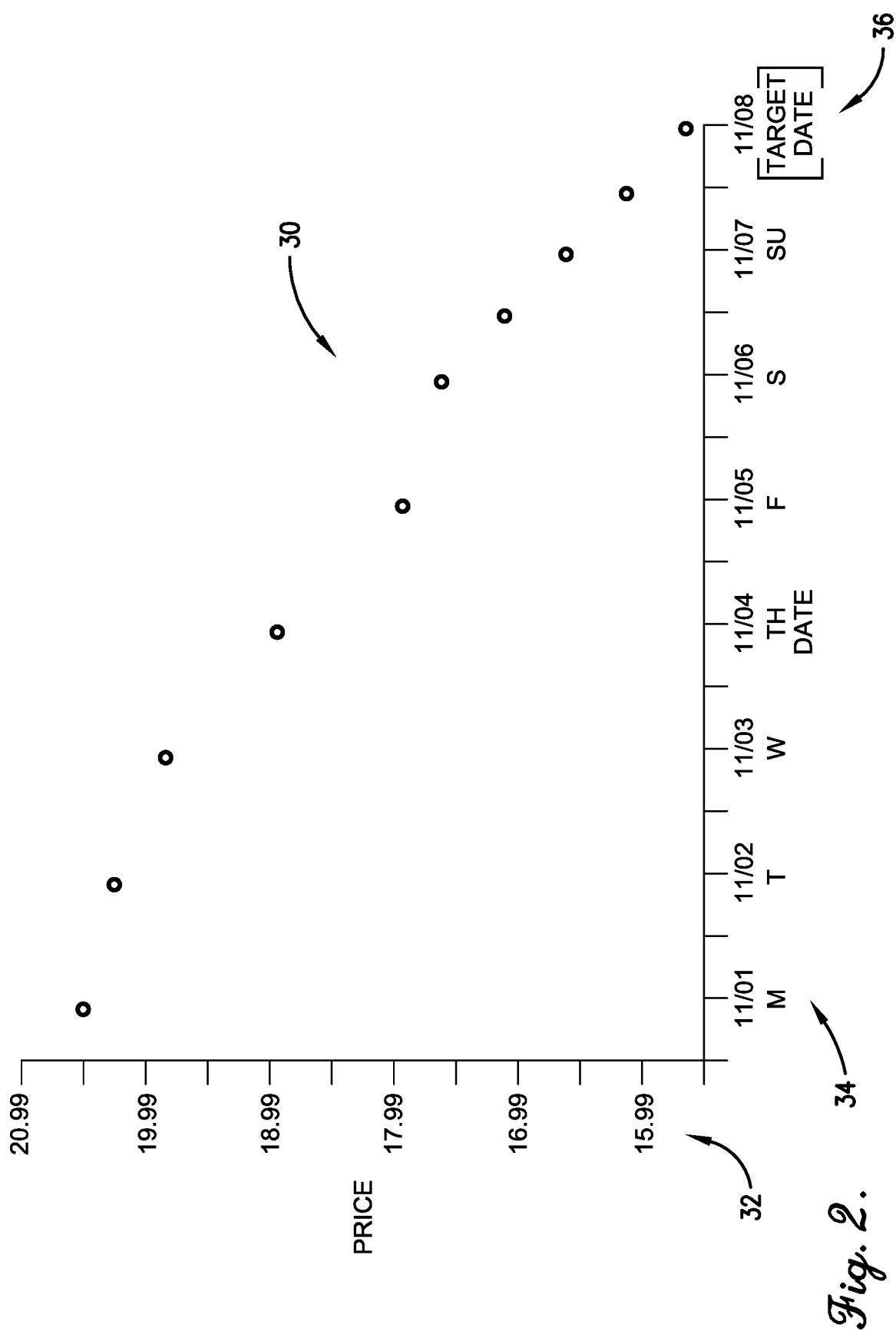
Figure 3:
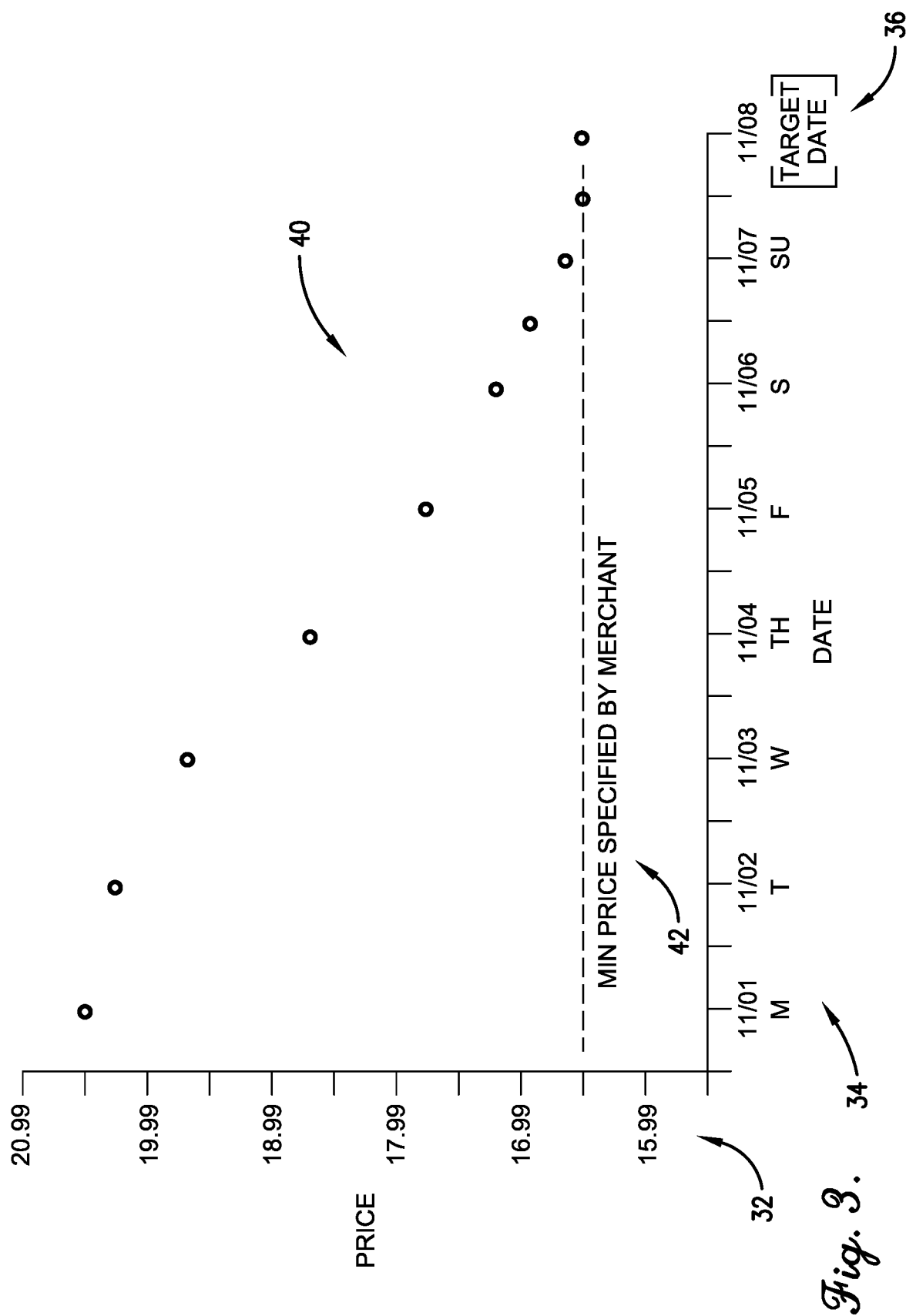

Embodiments of the present invention are described in detail below with reference to the attached drawing figures, wherein:

FIG. 1 is a high-level diagram of an embodiment of a system using artificial intelligence to determine an optimum price curve and dynamically update a product price in a store in real-time in order to maximize sales of and/or revenues from the product prior to a target date; and FIG. 2 is a first example of an optimum price curve developed by a dynamic pricing mechanism component of the system of FIG. 1 and/or the method of FIG. 4;

FIG. 3 is a second example of an optimum price curve developed by the dynamic pricing mechanism component of the system of FIG. 1 and/or the method of FIG. 4, wherein a merchant store component of the system has specified a minimum price; and FIG. 4 is a flowchart of steps of an embodiment of a method using artificial intelligence to determine an optimum price curve and dynamically update a product price in a store in real-time in order to maximize sales of and/or revenues from the product prior to a target date.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments concern a system and method using artificial intelligence to determine an optimum price curve and dynamically update a product price in a store in real-time in order to drive sales by incentivizing customers to purchase and thereby maximize sales of and/or revenues from the product prior to a target date (e.g., an expiration, best-use, shelf-life, or use-specific date). Broadly, embodiments may involve gathering and processing relevant data, training an artificial intelligence ("AI")-based dynamic pricing mechanism using the data, and allowing the dynamic pricing mechanism to automatically, directly, and dynamically change the product price in real-time in accordance with an optimum price curve. Embodiments may intelligently adapt to changing market conditions through ingestion of relevant data in real-time to reliably identify the optimal pricing points through continuous adaptive learning. Embodiments may also provide relevant updates and/or analytics to the merchant in real-time so that the merchant can plan inventories to further facilitate minimizing losses and maximizing sales and/or revenues and otherwise understanding the full behaviors of products for planning purposes. Embodiments may also automatically update inventory profiles in real-time. Thus, embodiments provide a number of advantages over the prior art, including reducing merchants' losses due to expired or otherwise out-of-date stock while increasing sales and/or revenues.

It will be appreciated that embodiments provide a particular solution (an artificial intelligence-based dynamic pricing mechanism configured to determine an optimum price curve and dynamically update a product price in a store in real-time) to a particular problem (a merchant's desire to maximize sales and/or revenue prior to an expiration or other target date) in a particular field (product sales) using particular integrated machines and other non-abstract elements (e.g., an Internet-of-things ("IoT") pricing mechanism or other electronic price display configured to receive and visually display the product price from the dynamic pricing mechanism).

Referring to FIG. 1, an embodiment of a system 10 and elements of an exemplary environment are shown using artificial intelligence to determine an optimum price curve and dynamically update a product price in a store in real-time in order to maximize sales and/or revenue from the product prior to a target date. The system and its environment may broadly comprise some or all of a merchant store 12; one or more merchant databases 14; one or more third-party application programming interfaces ("APIs") 16; an enhanced data engine and database 18; a dashboard and rules engine 20; an AI-based dynamic pricing mechanism 22; an Internet-of-things ("IoT") pricing mechanism 24 in the merchant store 12; and a communications network 26. In one implementation, the system 10 may function in accordance with some or all of the steps of the method 110 described below.

The merchant store 12 may be substantially any store selling any product having an expiration, best-use, shelf-life, use-specific, or other target date by which it is desirable to maximize sales and/or revenue, and which may therefore benefit from the improvement provided by the present invention. For example, the merchant store 12 may be a grocery and may benefit from maximizing sales of and/or revenue from foodstuffs which may have expiration dates or best-use dates after which the foodstuffs are no longer consumable or desired for consumption, or the merchant store 12 may be an appliance or electronics store and may benefit from maximizing sales of and/or revenue from of its stock prior to a shelf-life date after which the appliances or electronics must be removed in order to make room for the arrival of newer versions of the appliances or electronics.

The one or more merchant databases 14 may contain in electronic memory primary information initially collected by the merchant store 12 and relevant to the dynamic pricing mechanism 22 determining the price of the product. As used herein, information that is "relevant to the dynamic pricing mechanism 22 determining the price of the product" shall mean any information input into any variable included in the dynamic pricing mechanism 22. Such primary information may include timestamps (e.g., stock date, expiry date, sale or other exit date); pricing (e.g., stocked inventory price, purchased inventory price); merchant information (e.g., pricing points, store location, types of inventory, competitors); and location variables (e.g., supply/demand, inflation level, depression level, consumer habits, competitor pricing). In one implementation, the merchant databases 14 may contain one or more years of primary information.

The one or more third-party APIs 16 may be maintained by one or more third-parties (e.g., other merchants, data collection services) and may provide in electronic form secondary information which is relevant to the dynamic pricing mechanism 22 determining the price of the product. Such secondary information may include, e.g., coupons, groupons, or other price or other purchase incentives, or information about competing merchants. The secondary information may also include primary information for other merchants, including historical (e.g., one or more years) of primary information.

The enhanced data engine and database 18 may generate and contain enhanced information derived from the merchant-supplied primary information and the third-party-supplied secondary information, and the enhanced information may be used to build and train the AI-based dynamic pricing mechanism 22. Generating the enhanced data may include determining basic patterns in the data and generating graphical insights into the data to facilitate planning and implementing more detailed profiling later, and identifying any limitations or data quality errors in the generated enhanced data. Initially, derived fields may be generated, such as by grouping similar types of foods (e.g., all yogurts together, all breads together); labeling based on store location (e.g., city, suburb, rural); indicating whether a product is organic or not; and/or indicating whether the timeframe is during the work week or over a weekend. Many additional or alternative derived fields are possible depending on the nature of the product and the data. For example, from the timestamps information, enhanced information may be derived regarding the amount of time between when the product was stocked and its expiration date or other target date. Using this time-based enhanced information, the dynamic pricing mechanism 22 can be bounded by the timeframe depending on the inventory—i.e., the optimal price curve for maximum sales and/or revenue can be adapted to this period. For another example, from the merchant and location information, enhanced information may be derived regarding changes in price over time, changes in price versus competitor's price, optimal price to increase revenue, and optimal price to incentivize consumers to purchase. For another example, from the merchant and location information, enhanced information may be derived regarding an average number of customers per time period (e.g., per day, month, year), a total number of customers per day, a number of competitors within a particular distance, an average and total amount of revenue and loss per time period for the product, and an average and total amount of inventory sold per time period for the product. At least these factors may be used to build and train the dynamic pricing mechanism 22.

The dashboard and rules engine 20 may be configured to provide a computer-based electronic portal or other interface by which the merchant store 12 may customize at least aspects of the functioning of the dynamic pricing mechanism 22. For example, the dashboard and rules engine 20 may allow the merchant to specify a minimum price for a product below which the dynamic pricing mechanism 22 is not allowed to set the price for that product. For another example, the dashboard and rules engine 20 may allow the merchant store 12 to add incentives which affect the price of the product and/or change the target date. For yet another example, the dashboard and rules engine 20 may allow the merchant store 12 to emphasize profits over sales or sales over profits.

An artificial intelligence aspect of the AI-based dynamic pricing mechanism 22 may be built and trained on at least the enhanced information, and configured to use artificial intelligence to make an intelligent decision in determining an optimum price curve to drive sales of and/or revenue from the product and decrease waste, and then automatically, directly, and dynamically update the price of the product in accordance with the determined optimum price curve in real-time on the IoT pricing mechanism 24 in the merchant store 12.

In one implementation, the artificial intelligence may include one or more models that include one or more artificial intelligence classifiers such as neural networks, case-based reasoning, decision trees, genetic algorithms, fuzzy logic, and rules and constraints. In one implementation, aspects of all of these are integrated into the artificial intelligence aspect of the dynamic pricing mechanism 22. In one implementation, these may be further integrated with smart agents and associated real-time profiling, recursive profiles, and log-term profiles. The resulting trainable model(s) may be initially trained and periodically or continuously re-trained on at least the enhanced information derived from the primary and secondary information, and possibly also some or all of the primary information provided by the merchant store 12 and the secondary information provided by the third-party APIs 16, as well as other available relevant information.

The goal of the artificial intelligence aspect is to generate a price target rather than a conventional binary label. The artificial intelligence aspect may use a price success indicator which follows a bell curve in which zero is the ideal price and positive values mean the price was too high and negative values mean the price was too low. This allows for using the sales outcomes of specific merchants to predict which pricing will, over time, generate the best outcome for the merchant. A score of zero may indicate that the price is optimal and the pace of sales is such as to sell most or all units of a product before the target date without unduly lowering profits. A score greater than zero may indicate that the price is too high, so too little of the product is expected to sell. The higher the score, the more overpriced the product. A score of less than zero may indicate that the price is too low, so while most or all of the product is expected to sell, the same result could have been achieved with a higher price providing higher profits. The lower the score, the more underpriced the product. The price success indicator allows for training the model using supervised learning, which is generally superior to unsupervised learning. In one implementation, multiple models may be trained; one or more of the trained models with the best success predicting prices with favorable outcomes may be selected; and the pricing outputs of the selected models may be combined into a single model pricing score.

Additional details of example artificial intelligences can be found in, e.g., U.S. patent application Ser. No. 16/168,566, titled "Artificial Intelligence Fraud Management Solution," Ser. No. 16/424,187, titled "Behavior Tracking Smart Agents for Artificial Intelligence Fraud Protection and Management," and similar publicly available U.S patent applications and issued patents assigned to Brighterion, Inc.

In one implementation, the dynamic pricing mechanism 22 may receive as input at least the enhanced information and possibly also the primary information and, if available, the secondary information; determine the optimum price curve within the derived bounded timeframe to maximize sales and/or revenue by the target date; output a particular price for the current time or date from the price curve; and, in real-time, automatically transmit the particular price via the communications network 26 directly to the IoT price mechanism 24 for visual display or other communication to customers. FIG. 2 is an example graph of price 32 versus date 34, with the date axis bounded by a target date 36, and shows a first example of an optimum price curve 30 developed by the dynamic pricing mechanism 22. It will be appreciated that the optimal price curve for any given product and circumstances may be linear, non-linear, or linear in part and non-linear in part. The curve may be affected by such considerations as the day of the week, holidays, and/or other events.

The dynamic pricing mechanism 22 may also receive as input the custom specifications provided by the merchant store 12 via the dashboard and rules engine 20, which may be implemented by the dynamic pricing mechanism 22 as a weighting of one or more variables over others. For example, FIG. 3 is also an example graph of price 32 versus date 34 for the same product and date range as FIG. 2, and shows a second example of an optimum price curve 40 developed by the dynamic pricing mechanism 22, wherein the merchant store 12 has used the dashboard and rules engine 20 to specify a minimum price 42. In one implementation, the original curve 30 may simply be flattened at the minimum price to create the modified curve 40, while in another example, setting the minimum price 42 may accelerate or otherwise change prior portions of the curve 40.

In one implementation, the dynamic pricing mechanism 22 may learn to improve its dynamic pricing based on feedback data from the merchant store 12. Further, the dynamic pricing mechanism 22 may learn to improve based on feedback from a plurality of different merchants who also rely on the dynamic pricing mechanism 22 to automatically and dynamically control pricing. In one implementation, the dynamic pricing mechanism 22 may be further configured to provide in real-time updates and/or report in real-time analytics and other information back to the merchant store 12 via the dashboard and rules engine 20 and/or to one or more other communications solutions designated by the merchant store 12, as shown in 132.

The IoT pricing mechanism 24 may be physically located in the merchant store 12 and configured to electronically receive via the communications network 26 and visually display or otherwise communicate pricing information directly from the dynamic pricing mechanism 22. In one implementation, the IoT pricing mechanism 24 may include a physical structure (e.g., a shelf or container) in the merchant store 12 configured to physically support (e.g., on or in) one or more products, and may further include one or more electronic price displays 28 configured to visually communicate to consumers the prices of the products. At least the electronic price display 28 may be in electronic communication via the communications network 26 with the dynamic pricing mechanism 22, and the price communicated to the electronic price display 28 may be automatically, directly, and dynamically changed in real-time by the dynamic pricing mechanism 22 in accordance with the determined optimum price curve. In another implementation, the IoT pricing mechanism 24 may be a pricing gun in the merchant store 12 configured to print a price onto a label and then dispense the label for physical application to the product or a display of the product. In another implementation, the IoT pricing mechanism 24 may be a customer's smartphone executing a software application which visually displays the real-time price of the product for the customer. In another implementation, the IoT pricing mechanism 24 may be the store payment register which applies the discounted price at check-out.

The system 10 may include additional details discussed elsewhere herein, including those discussed below in describing the operating method 110.

Referring also to FIG. 4, an embodiment of a method 110 and aspects of an example environment are shown using artificial intelligence to determine an optimum price curve and dynamically update a product price in a store in real-time in order to maximize sales of and/or revenue for the product prior to a target date. The method 110 and its environment may broadly comprise some or all of the following steps. In one implementation, the method 110 may be implemented using the components of the system 10 described above.

A merchant store 12 may collect and maintain in electronic form in one or more merchant databases 14 primary information available to the merchant store 12 and relevant to the dynamic pricing mechanism 22 determining the price of the product, as shown in step 112. The merchant store 12 may be substantially any store selling any product having an expiration, best-use, shelf-life, use-specific, or other target date by which to maximize sales and/or revenue, and which may therefore benefit from the improvement provided by the present invention. The primary information contained in the merchant databases 14 may include timestamps (e.g., stock date, expiry date, exit date); pricing (e.g., stocked inventory price, purchased inventory price); merchant information (e.g., pricing points, location, types of inventory, competitors); and geolocation variables (e.g., supply/demand, inflation level, depression level, consumer habits, competitor pricing). In one implementation, the merchant databases 14 may contain one or more years of primary information.

One or more third-parties may collect and maintain in electronic form and provide via one or more third-party APIs 16 secondary information which is relevant to the dynamic pricing mechanism 22 determining the price of the product, as shown in step 114. The secondary information may include, e.g., coupons, groupons, or other price or other purchase incentives, or information about competing merchants. The secondary information may also include primary information for other merchants, including historical (e.g., one or more years) of primary information.

An enhanced data engine and database 18 may receive, collect, and process the merchant-supplied primary information and the third-party-supplied secondary information, as shown in step 116, and may derive therefrom or otherwise generate and store enhanced information which is relevant to the dynamic pricing mechanism 22 determining the price of the product, as shown in step 118. For example, from the timestamps information, enhanced information may be derived regarding the amount of time between when the product was stocked and its expiration date or other target date. For another example, from the merchant and location information, enhanced information may be derived regarding changes in price over time, changes in price versus competitor's price, optimal price to increase revenue, and optimal price to incentivize consumers to purchase. For another example, from the merchant and location information, enhanced information may be derived regarding an average number of customers per time period (e.g., per day, month, year), a total number of customers per day, a number of competitors within a particular distance, an average and total amount of revenue and loss per time period, and an average and total amount of inventory sold per time period.

A dashboard and rules engine 20 may allow the merchant store 12 to enter specific preferences or other instructions affecting at least aspects of the functioning of the dynamic pricing mechanism 22, as shown in step 120. For example, the merchant store 12 may specify a minimum price for a product below which the dynamic pricing mechanism 22 is not allowed to set the price for that product, or may add incentives which affect the price of the product and/or change the target date. For yet another example, the dashboard and rules engine 20 may allow the merchant store 12 to emphasize profits over sales or sales over profits.

An artificial intelligence aspect of the AI-based dynamic pricing mechanism 22 may be built and trained on at least the enhanced data and possibly the primary information and, if available, the secondary information, as shown in step 122. The dynamic pricing mechanism 22 may then use artificial intelligence to make intelligent decisions regarding the creation of an optimum price curve to drive sales of and/or revenue from the product and decrease waste, as shown in step 124. The dynamic pricing model 22 may also receive any specific instructions from the merchant store 12 via the dashboard and rules engine 20 and incorporate those instructions into the price-determining process, and then automatically, directly, and dynamically update the price of the product via a communications network 26 in real-time on an IoT pricing mechanism 24 in the merchant store 12, as shown in step 126.

The IoT pricing mechanism 24 may be physically located in the merchant store 12 and may electronically receive via the communications network 26 and visually display or otherwise communicate pricing information directly from the dynamic pricing mechanism 22, as shown in step 128. In one implementation, the IoT pricing mechanism 24 may include a physical structure (e.g., a shelf or container) in the merchant store 12 configured to physically support (e.g., on or in) one or more products, and may include one or more electronic price displays 28 configured to visually communicate to consumers the prices of the products. The electronic price display 28 may be in electronic communication via the communications network 26 with the dynamic pricing mechanism 22, and the price communicated to the electronic price display 28 may be automatically, directly, and dynamically changed in real-time by the dynamic pricing mechanism 22 in accordance with the determined optimum price curve. In another implementation, the IoT pricing mechanism 24 may be a pricing gun in the merchant store 12 configured to print a price onto a label and then dispense the label for physical application to the product or a display of the product. In another implementation, the IoT pricing mechanism 24 may be a customer's smartphone executing a software application which visually displays the real-time price of the product for the customer. In another implementation, the IoT pricing mechanism 24 may be the store payment register which applies the discounted price at check-out.

In one implementation, the dynamic pricing mechanism 22 may receive feedback information from the merchant store 12, and use the feedback information to learn to improve its dynamic pricing function, as shown in step 130. In one implementation, the dynamic pricing mechanism 22 may receive feedback information from a plurality of different merchants who also rely on the dynamic pricing mechanism 22 to automatically and dynamically control pricing, and may use the feedback information to learn to improve its dynamic pricing function, as shown in step 132. In another implementation, the dynamic pricing mechanism 22 may provide in real-time updates and/or report in real-time analytics and other information back to the merchant store 12 via the dashboard and rules engine 20 and/or to one or more other communications solutions designated by the merchant store 12, as shown in 134.

The method 110 may include additional details discussed elsewhere herein, including those discussed above in describing the implemented system 10.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for determining an optimum price curve to a target date and dynamically changing a price of a product in real-time in a store of a merchant to maximize revenue from the product prior to the target date, the system comprising:
    a merchant database of primary information which is relevant to determining the price of the product;
    a third-party data source of secondary information which is also relevant to determining the price of the product;
    an enhanced data engine and database configured to generate and store enhanced information which is derived from the primary information and the secondary information and which is relevant to determining the price of the product;
    a dashboard and rules interface configured to provide an electronic interface by which the merchant provides a specific instruction regarding an aspect of determining the price of the product;
    a dynamic pricing mechanism including an artificial intelligence trained on the enhanced information and configured to engage in continuous adaptive learning in real-time as new data is received to dynamically determine the optimum price curve for the product, wherein the optimum price curve reflects the specific instruction provided by the merchant via the dashboard and rules interface, and further configured to transmit a current price from the optimum price curve via a communications network,
    the artificial intelligence further configured to generate a price success indicator based on a result of the current price, wherein the price success indicator is on a bell curve in which a zero value indicates an ideal price, a positive value indicates a high price, and a negative value indicates a low price, and the price success indicator is used by the dynamic pricing mechanism in the continuous adaptive learning to dynamically determine the optimum price curve; and
    an electronic price display located in the merchant store and configured to receive from the dynamic pricing mechanism and visually display in real-time the current price of the product, the electronic price display including
        a fixed electronic price display mounted on a physical structure which physically supports the product, and/or
        a software application executed on a smartphone which visually displays in real-time the current price of the product for a user of the smartphone.

2. The system of claim 1, wherein the primary information includes
    timestamp information including a stock date, the target date, and a sale date;
    pricing information including a stocked inventory price and a purchased inventory price;
    merchant information including a price point, a location, a type of inventory, and one or more competitors; and
    geolocation information including supply and demand information, an inflation level, a depression level, one or more consumer habits, and a competitor price.

3. The system of claim 2, wherein
    the primary information includes one or more years of historical information; and
    the secondary information includes one or more years of historical third-party primary information for one or more other merchants.

4. The system of claim 1, wherein the enhanced information includes a time period within which to dynamically update the price of the product in order to maximize sales of or revenue from the product, wherein the time period is derived from a current date and the target date.

5. The system of claim 1, wherein the enhanced information includes a change in the price of the product over time, a first optimal price for maximizing sales, and a second optimal price for maximizing revenue.

6. The system of claim 1, wherein the enhanced information includes one or more of the following: an average number of customers per time period, a total number of customers per time period, a number of competitors within a particular distance from the store, an average amount of revenue per time period, an average loss per time period, a total amount of revenue per time period, and a total loss per time period, an average amount of inventory sold per time period, a total amount of inventory sold per time period.

7. The system of claim 1, wherein the specific instruction provided by the merchant using the dashboard and rules interface is a minimum price for the product below which the dynamic pricing mechanism cannot set the price for the product.

8. The system of claim 1, wherein the dynamic pricing mechanism is further configured to receive feedback information provided by the merchant and to learn from the feedback information to improve determining the optimum price curve for the product.

9. The system of claim 1, wherein the dynamic pricing mechanism is further configured to communicate to the merchant via the dashboard and rules interface one or more analytics regarding the sales of the product.

\* \* \* \* \*